Oct. 20, 1970 TERUICHI TOMURA 3,535,548

ELECTRIC PULSE GENERATING CIRCUIT

Filed Sept. 8, 1966

2 Sheets-Sheet 1

United States Patent Office 3,535,548

Patented Oct. 20, 1970

3,535,548

ELECTRIC PULSE GENERATING CIRCUIT

Teruichi Tomura, Kokubunji-shi, Japan, assignor to Hitachi, Ltd., Tokyo-to, Japan Filed Sept. 8, 1966, Ser. No. 577,949
Claims priority, application Japan, Sept. 8, 1965, 40/54,646; Sept. 13, 1965, 40/55,645
Int. Cl. G06g 7/12
U.S. Cl. 307—229 11 Claims

ABSTRACT OF THE DISCLOSURE

A monostable multivibrator including normally conducting and nonconducting elements, and a time-constant circuit having an analogically logarithmic discharge characteristic connected with the input of the normally conducting element, said time-constant circuit being normally charged with a constant bias voltage and periodically discharged with a variable bias voltage upon switching of said multivibrator in response to application of a trigger pulse thereto, thereby obtaining output pulses whose duration time is varied in accordance with the level of the variable bias voltage.

Figure 1:
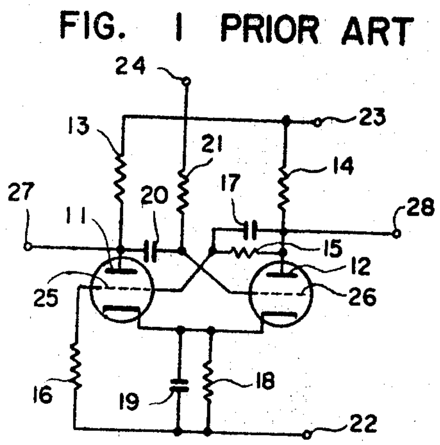
FIG. 1 PRIOR ART

This invention relates to an electric pulse generating circuit, and more particularly to an electric pulse generating circuit using a monostable multivibrator.

Electric multivibrators have been used for many years for generating electric pulses. In such an electric pulse generating circuit, it is advantageous that the duration-time or time-width of generated pulses can be easily adjusted or varied in accordance with applied control signals. For this purpose, there have been attempts to change the time-constant of a C–R element which is inserted into a feedback portion of the multivibrator circuit. However, it is impossible to adjust, continuously, the duration-time of generated pulses in these arrangements since such adjustment is carried out by switching over a plurality of circuit components constituting such C–R element. On the other hand, there have also been attempts to vary the duration-time by controlling the electrical operating potential or bias voltage of the C–R element. According to this method, however, it is difficult to vary, over a wide range, the duration-time for reasons which will be hereinafter explained.

Accordingly, it is an object of the present invention to provide an electric pulse generating circuit which can vary the duration-time of generated pulses over a very wide range.

It is another object of the present invention to provide an electric pulse generating circuit which can vary, continuously, the duration-time of generated pulses.

Still another object of the present invention is to provide an electric pulse generating circuit which can vary the duration-time of generated pulses without using any mechanical or electro-mechanical switching means.

Further object of the present invention is to provide an electric pulse generating circuit which can exhibit high stability throughout the full controlling range of the duration-time of generating pulses.

According to the present invention, a time-constant circuit comprising a series connection of a plurality of C–R elements is used for the purpose of controlling the duration-time of pulses. Each of such C–R elements comprises a parallel connection of a capacitor and a resistor. During one steady state mode of operation of the electric multivibrator, these elements are connected, respectively, to electric sources and supplied electric charges therefrom. Such electric sources are cut off from the C–R elements when the multivibratory is quickly inverted to another state by a trigger pulse. Then the electric charges on the capacitors of the C–R elements discharge through the resistors thereof. If the electric components of each element are adequately set up, the time-constant circuit shows, as a whole, an analogically logarithmic discharge characteristic.

Using of a time-constant circuit having a logarithmic characteristic brings many advantages, such as, control of the duration-time of generated pulses throughout a very wide range, and continuous control of such duration-time. Moreover, it is possible to control such duration-time with a high degree of stability according to the present invention.

Figure 2:
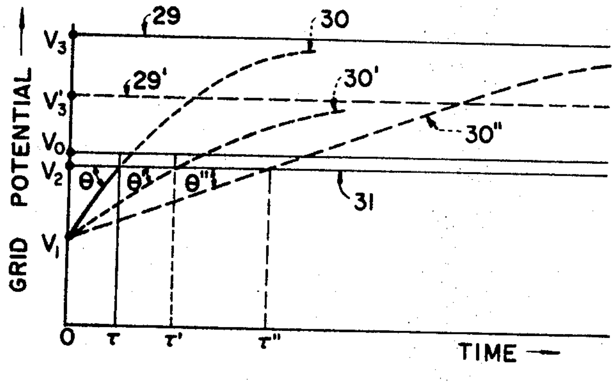
FIG. 2 PRIOR ART
Figure 3:
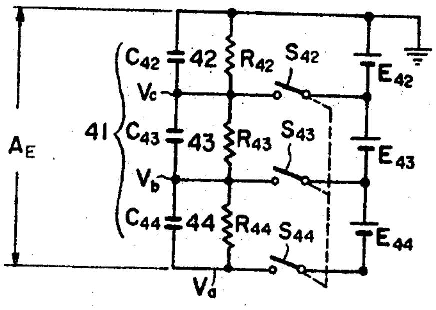
Figure 4:
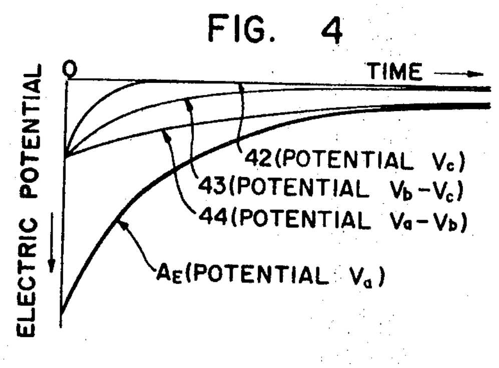
Figure 8:
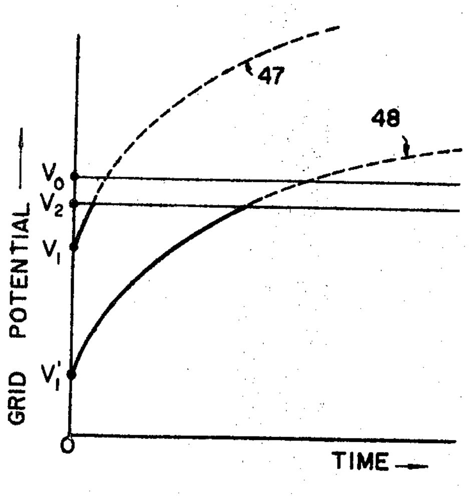
Figure 5:
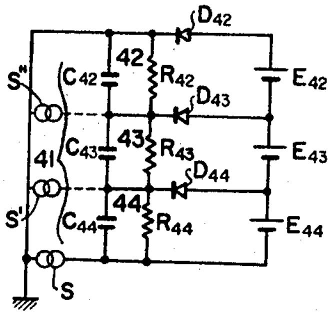
Figure 6:
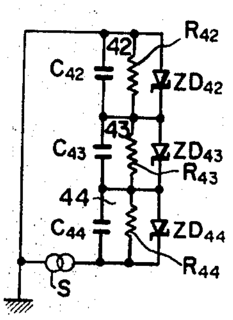
Figure 7:
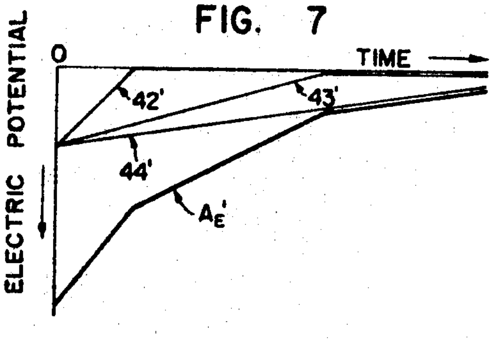
Figure 9:
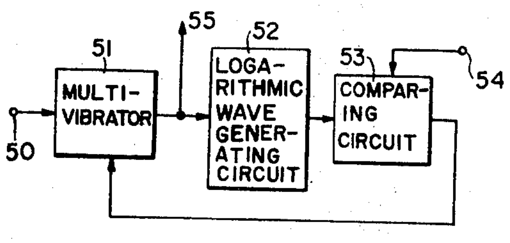
Figure 10:
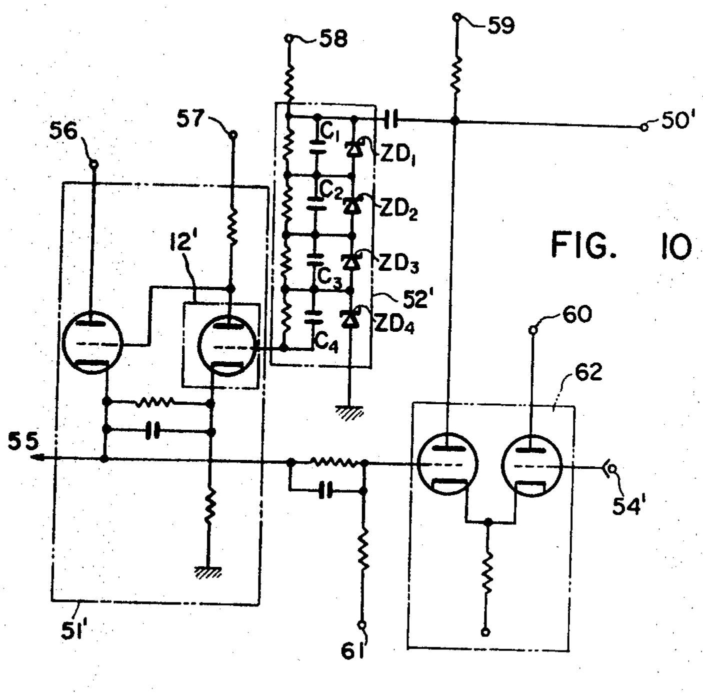
Figure 11:
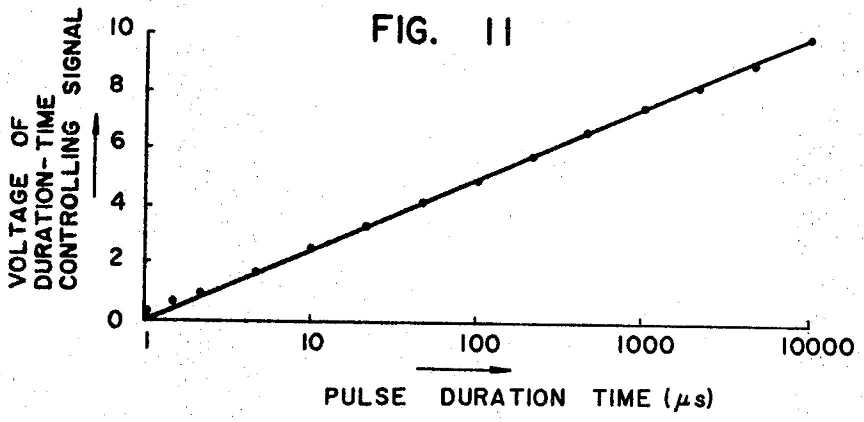

These and additional objects and advantages of the present invention will become more apparent from the following description, taken in conjunction with the following drawing, in which:

FIG. 1 shows a circuit arrangement of an example of conventional monostable multivibrators, FIG. 2 is a grid potential versus time characteristic diagram for explaining the operation of the conventional multivibrator shown in FIG. 1, FIG. 3 shows a circuit diagram for explaining the basic theory of the present invention, FIG. 4 is a potential versus time characteristic diagram of the circuit shown in FIG. 3, FIG. 5 shows an embodiment of the time-constant circuits according to the present invention, FIG. 6 shows another example of the time constant circuits according to the present invention, FIG. 7 is a potential versus time characteristic diagram showing the operation of the time-constant circuit shown in FIGS. 5 and 6, FIG. 8 is a grid potential versus time characteristic diagram for explaining the theory of adjustment of the duration-time of generated pulses according to the present invention, FIG. 9 is a schematic diagram of an embodiment of the present invention, FIG. 10 is a circuit diagram of another embodiment, and FIG. 11 is a characteristic diagram showing the operation of the embodiment of the present invention.

In FIG. 1 which illustrates an example of conventional pulse generating circuits using a monostable multivibrator, the numerals 11 and 12 designate electron tubes. The numerals 13 to 16, 18 and 21 designate electric resistors. The numerals 17, 19 and 20 designate electric capacitors. The numerals 22 to 24 designate terminals of electric sources. And, the numerals 25 and 26 designate control grids of the electron tubes 11 and 12, respectively.

During the normal steady state mode of operation of the multivibrator the tube 11 is non-conductive, and the tube 12 is conductive. When a negative trigger pulse is supplied from a terminal 27 to the grid 26 of the tube 12 through the capacitor 20, the plate current of the tube 12 reduces, and the electrical potential on the plate of the tube 12 suddenly rises. This increase in potential is transmitted to the grid 25 of the tube 11 through the capacitor 17, and the potential on the grid 25 is also suddenly raised. Consequently, the plate current of the tube 11 is caused to increase, and the electrical potential on the plate of the tube 11 is caused to lower. This lowered potential is fed back, positively, to the grid 26 of the tube 12 through capacitor 20 to quickly drive tube 12 into cut-off. Thus, the tube 11 becomes quickly conductive and the tube 12 becomes quickly non-conductive. The reset time of the multivibrator is determined by the time-constant of the C–R element 20, 21 connected between the plate of the tube 11 and the grid 26 of the tube 12. Since such operation of the multivibrator has been well known, it will be unnecessary to describe it in further detail. The rectangular waveshape pulses generated by the circuit can be taken out from a terminal 28.

In the pulse generating circuit of FIG. 1, the duration-time or time-width of pulses can be varied by changing the circuit time constant of the C–R element 20, 21, or by changing the voltage supplied to the terminal 24. FIG. 2 illustrates variations of the grid potential of the tube 12 (vertical axis) to progress of time (horizontal axis). In this figure, the reference $V_1$ shows the potential on the grid 26 at an instant when the tube 12 is quickly inverted from the conductive state (steady state) to the non-conductive state. The reference $V_3$ shows the value of a potential supplied from an electric source (not shown) to the terminal 24. After the tube 12 becomes non-conductive, the potential on grid 26 is gradually raised from the value $V_1$ toward the potential $V_3$ (the asymptote 29) along the exponential curve 30 which is determined both by the circuit constants of the capacitor 20 and the resistor 21 and by the potential $V_3$. At an instant when the grid potential exceeds the recovery potential $V_2$ of the tube 12, the tube 12 becomes conductive and the monostable multivibrator is caused to quickly reset to its normal steady state mode of operation with tube 12 conducting. Thus, pulses having a duration-time of $\tau$ are generated in the multivibrator.

In the case that the potential supplied to the terminal 24 reduces from $V_3$ to $V_3'$, the potential on the grid 26 is gradually raised from the value $V_1$ toward another $V_3'$ (the asymptote 29') along another exponential curve 30'. Consequently, the potential on the grid 26 does not exceed the recovery potential $V_2$ up to the time $\tau$. Thus, the duration-time of generated pulses is lengthened from $\tau$ to $\tau'$. This means that the duration-time of generated pulses can be varied or controlled by changing the value of the potential supplied to the terminal 24.

In the meantime, it is essential to keep the potential on the grid 26 at a value higher than $V_0$ which is the lower limit value necessary to maintain the tube 12 under the conductive state. Moreover, the cross angle $\theta$ between the curve 30 and the level 31, which is the recovery potential $V_2$, tends to become small when using any lower values of the potential $V_3$. In case a small cross-angle $\theta$ is used, the duration time $\tau$ tends to be unexpectedly changed by a small variation of the recovery potential $V_2$. For these reasons, according to this known method, it has been impossible to lower the potential $V_3$ beyond a certain value. Hence, it has been difficult to adjust the duration-time of pulses over a very wide range by the above-mentioned technique. According to experiments the maximum adjustment range by such technique was only 1:10 (the ratio of the shortest duration-time to the longest duration-time).

It is also possible to vary the duration-time of pulses by means of changing the time-constant of the C–R element 20, 21. In this case, the potential $V_3$ can be fixed at a relatively high value in comparison with the recovery potential $V_2$, and the cross angle $\theta'$ between exponential curve 30'' and level 31 can be kept at a comparatively high value. Therefore, the disadvantages as mentioned above can be eliminated, but it is necessary to utilize a number of circuit components constituting such C–R element and to switch them over by mechanical or electromechanical switching means in order to obtain a desired time-constant. Consequently, it is impossible to vary, continuously, the duration-time of generated pulses.

According to the present invention, a circuit having a logarithmic discharge characteristic is used for the time-constant element instead of the circuit having an exponential discharge characteristic as used in the conventional apparatus.

The logarithmic discharge curve may be generally expressed as follows:

$$E=K \log t \tag{1}$$

where E represents the discharge voltage, $t$ represents time, and K represents a constant. As well known, $$\frac{dE}{dt/t}$$

of the Equation 1 always shows a certain constant value, and such logirithmic curve does not have any asymptotes. Accordingly, if a circuit having such logarithmic discharge characteristic is used for the time-constant element, the variation of the potential on the grid against the logarithm of time is always a constant value in spite of the value of the potential supplied to the time-constant element.

FIG. 3 illustrates the basic theory of the time-constant circuit according to the present invention. A C–R circuit shown, generally, with the numeral 41 comprises a series connection of three elements 42, 43 and 44, each of which comprises a parallel connection of a capacitor C and a resistor R. These elements 42, 43 and 44 are connected, respectively, to electric sources $E_{42}$, $E_{43}$ and $E_{44}$ through switches $S_{42}$, $S_{43}$ and $S_{44}$. During the ordinary state, all switches $S_{42}$, $S_{43}$ and $S_{44}$ are closed, and the voltages $E_{42}$, $E_{43}$ and $E_{44}$ are supplied to the elements 42, 43 and 44. When the switches are opened, electric charges on the capacitors $C_{42}$, $C_{43}$ and $C_{44}$ discharge through the resistors $R_{42}$, $R_{43}$ and $R_{44}$, respectively. Therefore, the voltage $A_E$ appearing across the C–R circuit 41 varies along a curve given by the following equation.

$$A_E=E_{42}e^{-\frac{t}{\tau 42}}+E_{43}e^{-\frac{t}{\tau 43}}+E_{44}e^{-\frac{t}{\tau 44}} \tag{2}$$

where:

$\tau_{42}=C_{42}R_{42}$
$\tau_{43}=C_{43}R_{43}$
$\tau_{44}=C_{44}R_{44}$

Discharge curves of the elements 42, 43 and 44 are illustrated in a juxta positioned relation in FIG. 4, assuming $\tau_{44} \ll \tau_{43} \ll \tau_{42}$. The totalized voltage across the circuit 41 is shown with the curve $A_E$. It will be apparent that the summation curve 45 represents a certain logarithmic discharge characteristic which is analogically obtained by using the so-called mathematical development method. In this case, if the following conditions are given $$E_{42}=E_{43}=E_{44}=E$$

and $$\tau_{42}=\tau;\ \tau_{43}=10\tau;\ \tau_{44}=100\tau$$

the Equation 2 can be rewritten as follows:

$$A_E=E\left(e^{-\frac{t}{\tau}}+e^{-\frac{t}{10\tau}}+e^{-\frac{t}{100\tau}}\right) \tag{3}$$

Consequently, if such values as $$E=1\text{ v.};\ \tau_{42}=1\ \mu\text{sec.};\ \tau_{43}=10\ \mu\text{sec.};\ \tau_{44}=100\ \mu\text{sec.}$$

are given, the circuit 41 can exhibit a logarithmic characteristic throughout a range of about three or four decades (1 to $10^3$ or $10^4$).

FIGS. 5 and 6 illustrate two embodiments of the time-constant circuit as mentioned above, in which the same numerals or references as FIG. 3 identify similar elements. In these embodiments, the switches $S_{42}$, $S_{43}$ and $S_{44}$ are replaced with diodes $D_{42}$, $D_{43}$ and $D_{44}$, or with Zener-diodes $ZD_{42}$, $ZD_{43}$ and $ZD_{44}$.

In FIG. 5, the diodes are used for electrical switching elements and are controlled by a controlling signal S. That is to say, the diodes are cut off by a controlling signal S having a predetermined negative voltage, and the same discharge curves as mentioned above referring to FIG. 3 are obtained. A plurality of controlling signals may be used as shown with the references S, S′ and S″ in the figure.

In FIG. 6, the Zener diodes $ZD_{42}$, $ZD_{43}$ and $ZD_{44}$ are used for constant voltage sources as well as for switching elements. The electric sources (not shown) may be connected to each element 42, 43, or 44, but, in this case, the controlling signal S is also used for a power source.

The diodes or Zener-diodes $D_{42}$, $D_{43}$ and $D_{44}$, or $ZD_{42}$, $ZD_{43}$ and $ZD_{44}$, which are non-linear elements, can be used as resistance elements, and in such case it is possible to eliminate the resistors $R_{42}$, $R_{43}$ and $R_{44}$. In this instance, the discharge characteristics of the elements 42, 43 and 44 exhibit bent characteristic curves as shown with the numerals 42′, 43′ and 44′ in FIG. 7, and the summation voltage also exhibits an analogically logarithmic curve having bent portions as shown with the numeral $A_E'$.

The adjustment or variation of the duration-time of generated pulses can be carried out by changing the bias voltage supplied to the time-constant circuit as shown in FIG. 8, in which the same numerals or reference characters used in FIG. 2 are employed to identify the same things or meanings. In FIG. 8, if the operating potential of the logarithmic curve 47 is moved from $V_1$ to $V_1'$, the curve is transferred as shown with the numeral 48, and the duration-time of pulses can be widely varied.

FIG. 9 is a functional block diagram of an embodiment of the present invention. A trigger pulse from a terminal 50 is supplied to multivibrator 51, and the multivibrator is quickly inverted into another state. The output of the multivibrator 51 is partially supplied to a logarithmic-wave generating circuit 52 comprising a time-constant circuit and converted into an analogically logarithmic wave. The output of the logarithmic-wave generating circuit 52 is supplied to a comparing circuit 53. At an instant when the amplitude of the logarithmic wave reaches a predetermined value, the multivibrator 51 is quickly reset. A controlling signal for determining the duration-time of pulses is supplied from a terminal 54. A terminal shown with the numeral 55 is for taking the generated pulses out.

FIG. 10 is a detailed circuit diagram of another embodiment of the present invention. Terminals 56 to 61 inclusive are connected to adequate DC-supply sources. In this figure, the numeral 62 shows a gate circuit which is controlled by the controlling signal from the terminal 54′ so as to convert the output signal of the multivibrator 51′ into a signal having an amplitude which is proportional to the controlling signal. The output signal of the gate circuit 62 is supplied to the logarithmic wave generating circuit 52′ to cut off the Zener-diodes ZD. The Zener-diodes ZD are always supplied DC voltage from the terminal 58 and exhibit predetermined constant voltages. If the Zener-diodes ZD are cut off by the signal from the gate circuit 62, the logarithmic-wave generating circuit 52′ produces a logarithmic wave as mentioned above in detail and controls the grid potential of the tube 12′. If the controlling signal from the terminal 54′, which is usually a DC voltage, is varied, the duration time of the pulses generated by the multivibrator 51′ can be widely adjusted.

FIG. 11 illustrates the output characteristic of an embodiment of the present invention, in which the horizontal axis shows the duration time of generated pulses, and the vertical axis shows the voltage of signal for controlling the duration-time of pulses. In this case, the C–R circuits of four stages are used for the time-constant circuit of the multivibrator.

According to the present invention it is possible to vary the duration-time in very wide range, such as more than $10^{10}$ and the stability of the circuit is kept very high in comparison with the conventional circuits. Moreover, it is possible to vary the duration-time of pulses by using only electrical means. Therefore the pulse generating circuit of the present invention is very useful in various application such as a scanning apparatus in X-ray microanalyzers, a time regulation apparatus and the like.

While I have shown and described only a few embodiments of the present invention, it will be understood that the same is not limited thereto but is susceptible of numerous changes and modifications as known to a person skilled in the art, and, I therefore do not wish to be limited to the details shown and described herein but intended to cover such modifications and changes as are apparent to one of ordinary skill in the art.

I claim:

1. An electric pulse generating circuit comprising:

an electric monostable multivibrator having a normally conducting element and a normally nonconducting element in a first steady operating state which is quickly inverted from said first steady operating state into a second operating state by a trigger pulse source and thereafter resets automatically to the first steady operating state, a time-constant circuit having an analogically logarithmic discharge characteristic inserted within a feed back path of the multivibrator connecting the output of said normally nonconducting element to the input of said normally conducting element for determining the reset time of the multivibrator, said time-constant circuit comprising a series connection of a plurality of C–R parallel circuits, each of which comprises a parallel connection of a capacitor and a resistor, a source of electrical potential connected to the time-constant circuit, Zener-diodes connected across each of the C–R parallel circuits for limiting the voltages thereacross to constant values in the first steady operating state, and gate circuit means coupled to the time-constant circuit for cutting off the zener-diodes and controlling the discharge operating potential of the time-constant circuit by supplying a variable bias voltage to the time-constant circuit in the second operating state.

2. In an electric pulse generating circuit including an electric multivibrator having a normally conducting element and a normally nonconducting element first path means connected between the input of the normally conducting element and the output of the normally nonconducting element for positively feeding the output signal of the normally nonconducting element to the normally conducting element so as to switch the normally conducting element into an opposite conductivity condition with respect to normal, second path means connected between the input of the normally nonconducting element and the output of the normally conducting element for positively feeding the output signal of the normally conducting element to the normally nonconducting element so as to switch the normally nonconducting element into an opposite conductivity condition with respect to normal, and means for applying trigger pulses to either one of the inputs of the normally conducting and nonconducting elements so as to reverse the conductivity conditions of said elements from their normal conditions, respectively; the improvement comprising:

a time-constant circuit having an analogically logarithmic discharge characteristic connected between the output of the normally non-conducting element and the input of the normally conducting element to reset the monostable multivibrator;

power supplying means connected with the time-constant circuit for supplying a variable bias voltage to the time-constant circuit when the trigger pulse is applied to the multivibrator; and switching means included in said time-constant circuit for normally connecting a constant bias voltage source and the time-constant circuit when the monostable multivibrator is in its normal condition so that the time-constant circuit is charged with the constant bias voltage and means associated with said switching means for disconnecting the constant bias voltage source and the time constant circuit by application of the variable bias voltage supplied from power supplying means to said time constant circuit in response to application of the trigger pulse to the monostable multivibrator so that the time-constant circuit is discharged;

the disconnection between the constant bias voltage source and the time-constant circuit being so long as said elements are retained in the reversed conditions, thereby obtaining a pulse output.

3. An electric pulse generating circuit according to claim 2, which further comprises means for adjusting said bias voltage so as to vary the duration time of generated pulses.

4. An electric pulse generating circuit according to claim 2, in which said time constant circuit comprises a series connection of a plurality of C–R elements, each of which comprises a parallel connection of a capacitor and a resistor and has a time constant different from that of the other C–R elements so that the analogically logarithmic discharge characteristic thereof is determined by the sum of the respective time constants of the plurality of said C–R elements.

5. An electric pulse generating circuit according to claim 4, in which said switching means comprises diodes connected across each of the C–R elements.

6. An electric pulse generating circuit according to claim 4, in which said switching means comprises zener-diodes connected across each of the C–R elements.

7. An electric pulse generating circuit comprising:

an electric monostable multivibrator having a normally conducting element and a normally nonconducting element, the conductivity state of each being determined to be opposite to that of the other, respectively, and being retained in a first steady operating state which is quickly switched into a second operating state by a trigger pulse wherein said elements reverse their conducting states, and thereafter resets automatically to the first steady operating state, a time constant circuit having an analogicly logarithmic discharge characteristic connected between the output of the normally non-conducting element and the input of the normally conducting element of the multivibrator for determining the reset time of the multivibrator, a constant bias voltage source and switching means included in said time constant circuit for normally connecting said constant bias voltage source to said time-constant circuit so that the time-constant circuit is charged with the constant bias voltage when the monostable multivibrator is in its normal condition, a variable bias voltage source and control means for controlling said switching means to disconnect said constant bias voltage source from said time-constant circuit in response to application of a trigger pulse to said multivibrator and at the same time connecting said viariable bias voltage source to said time constant circuit.

8. An electric pulse generating circuit according to claim 7, in which said controlling means includes gate circuit means for converting the output signal of the multivibrator into a duration-time control signal proportional to a duration-time control voltage supplied thereto.

9. An electric pulse generating circuit according to claim 7 wherein said time-constant circuit comprises a series connection of a plurality of C–R elements, each of which comprises a combination of a capacitor and a nonlinear element and has a time constant different from that of the other C–R elements so that the analogically logarithmic discharge characteristic thereof is determined by the sum of the respective time constants of the plurality of said C–R elements.

10. An electric pulse generating circuit according to claim 9, in which said nonlinear element is a diode.

11. An electric pulse generating circuit according to claim 9, in which said non-linear element is a Zener-diode.

References Cited

UNITED STATES PATENTS 3,164,770 1/1965 Turner -------------- 324—78

JOHN S. HEYMAN, Primary Examiner

R. C. WOODBRIDGE, Assistant Examiner

U.S. Cl. X.R.

307—273, 291; 328—145; 332—14